United States Patent
Higashi et al.

(10) Patent No.: US 6,749,145 B2
(45) Date of Patent: Jun. 15, 2004

(54) WINDING METHOD AND DEVICE FOR AN ARMATURE FOR ROTARY ELECTRIC MACHINES

(75) Inventors: Hisanobu Higashi, Shizuoka-ken (JP); Hiroaki Kondo, Shizuoka-ken (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/064,923

(22) Filed: Aug. 29, 2002

(65) Prior Publication Data

US 2003/0047636 A1 Mar. 13, 2003

(30) Foreign Application Priority Data

Sep. 7, 2001 (JP) ........................................ 2001-271207

(51) Int. Cl.⁷ .............................................. H02K 15/09

(52) U.S. Cl. ...................................... 242/433.4; 29/596

(58) Field of Search .............................. 242/433, 433.1, 242/433.2, 444, 445.1; 29/596

(56) References Cited

U.S. PATENT DOCUMENTS

| | | | | |
|---|---|---|---|---|
| 2,714,174 A | * | 7/1955 | Applegate | 310/265 |
| 5,172,870 A | * | 12/1992 | Van Assema | 310/198 |
| 5,484,114 A | * | 1/1996 | Santandrea et al. | 242/433.1 |
| 5,915,643 A | * | 6/1999 | Dolgas | 242/433 |
| 6,079,659 A | * | 6/2000 | Yamamura et al. | 242/433.2 |
| 6,141,865 A | * | 11/2000 | Kakutani et al. | 29/733 |

FOREIGN PATENT DOCUMENTS

GB 2250384 * 3/1992

* cited by examiner

*Primary Examiner*—Emmanuel Marcelo
(74) *Attorney, Agent, or Firm*—Ernest A Beutler

(57) ABSTRACT

A rotating electrical machine such as electrical starter motor and more particularly to an improved method and apparatus for winding the armature coils of a rotating electrical machine. The winding apparatus and method is particularly adapted for use with large diameter wires and permits winding without a winding needle having to pass into the slot between the pole teeth. This is accomplished by introducing some slack in the wire by moving the wire in a circumferential direction when the winding needle is not disposed in proximity to the slot and then returning the winding needle to registry with the slot.

36 Claims, 21 Drawing Sheets

FIG. 4
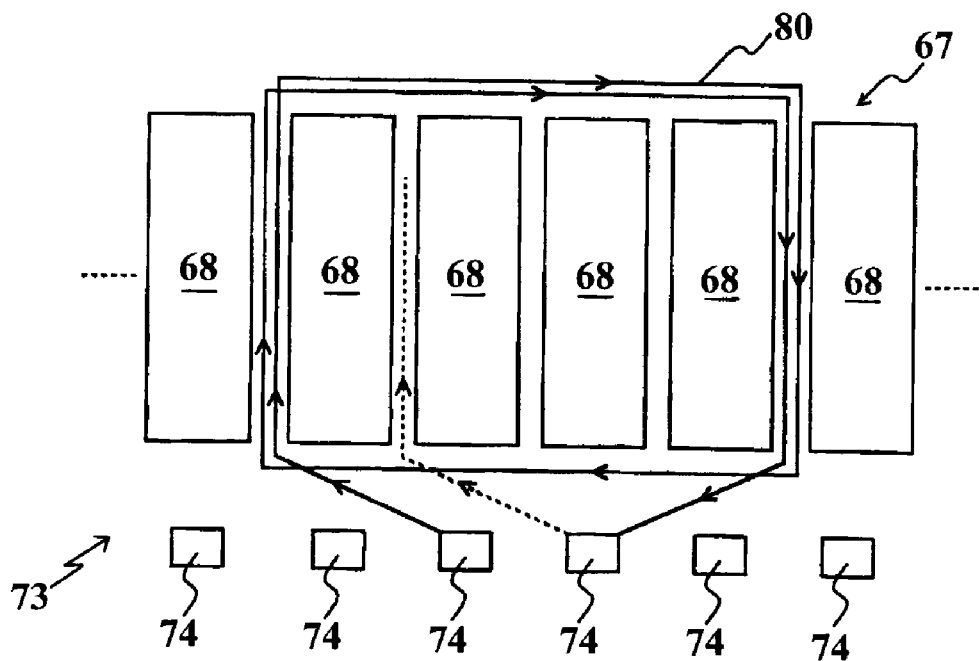
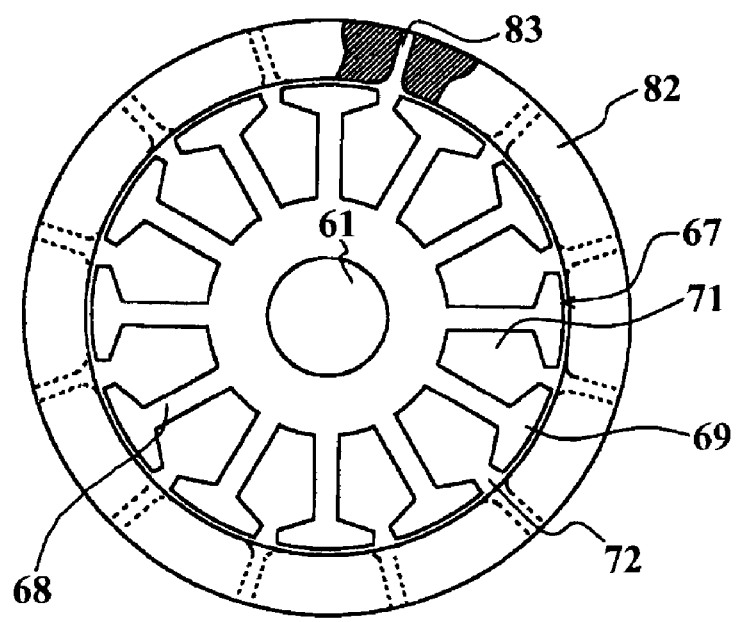
FIG. 5

FIG. 8
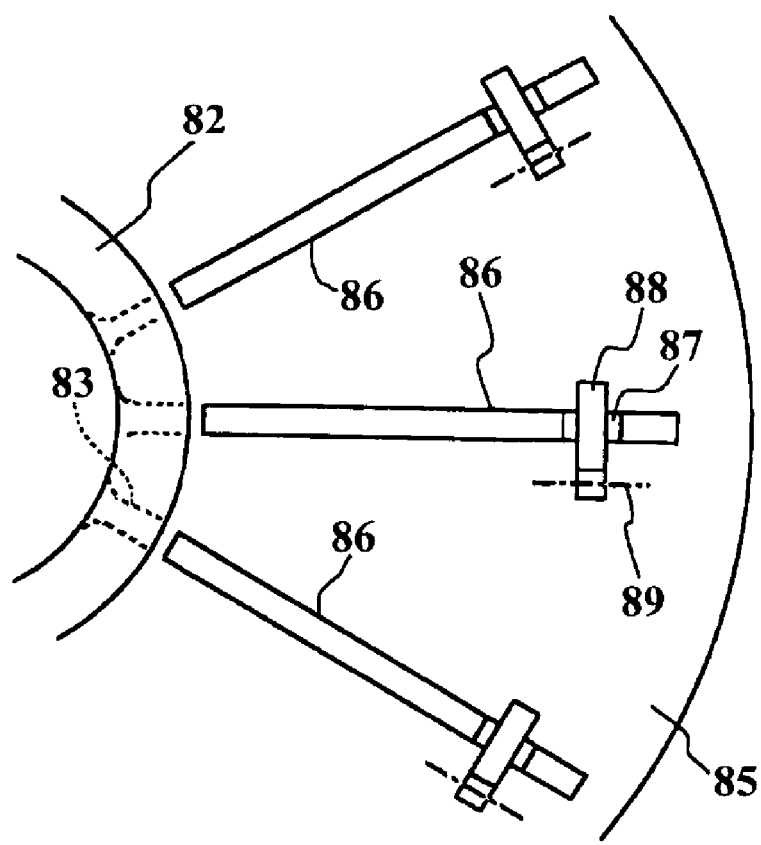
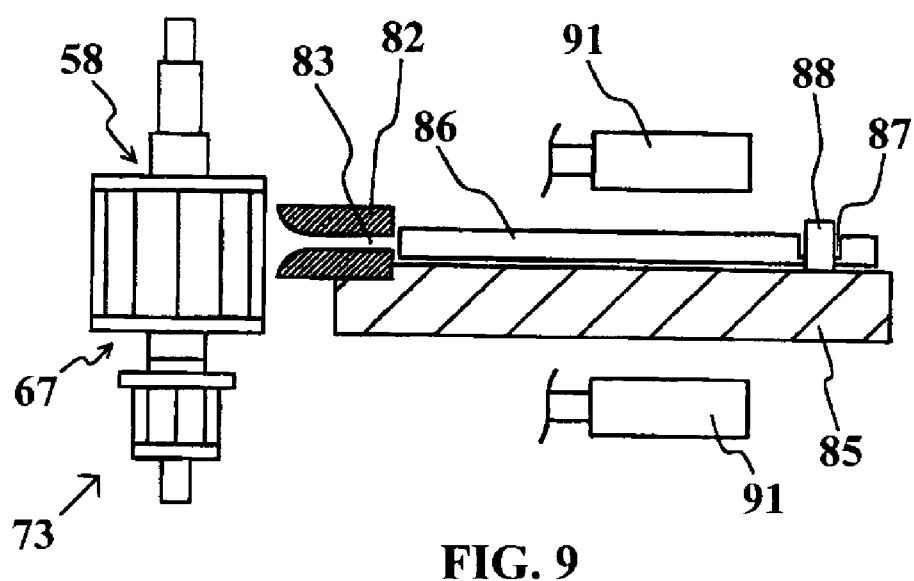
FIG. 9

FIG. 10
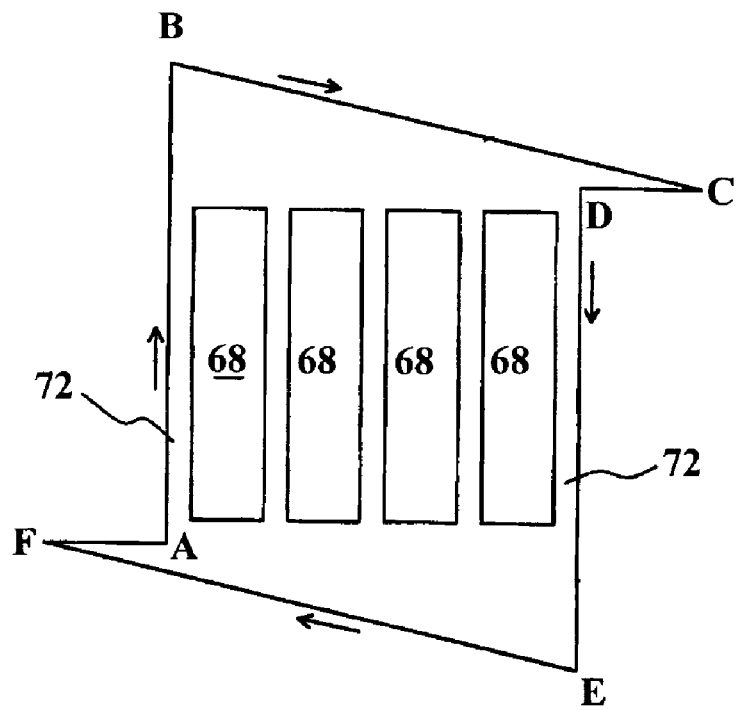
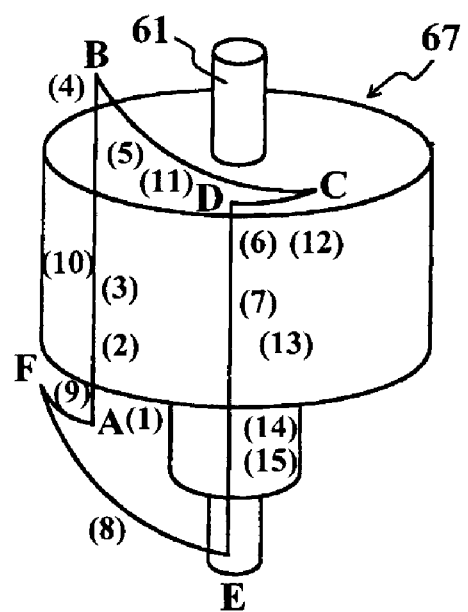
FIG. 11

FIG. 12 (1)
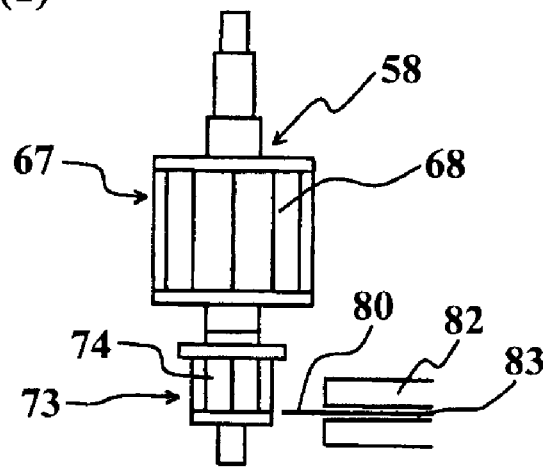
FIG. 12 (2)
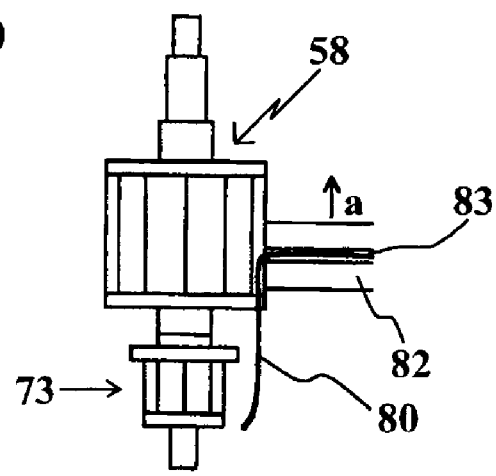
FIG. 12 (3)
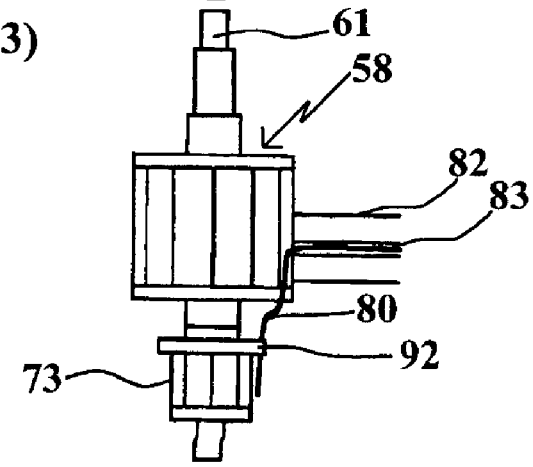

FIG. 12 (4) 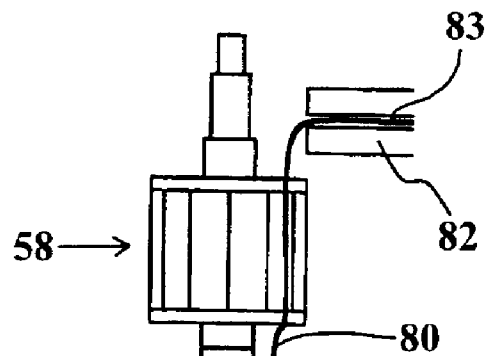
FIG. 12 (5) 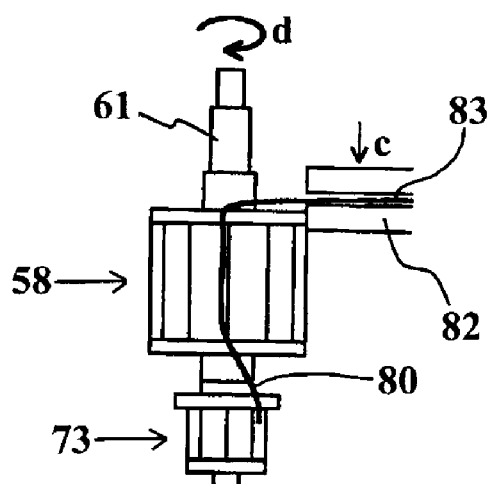
FIG. 12 (6) 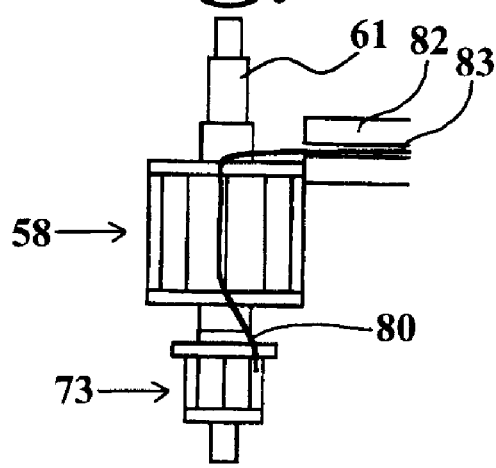

FIG. 12 (7)
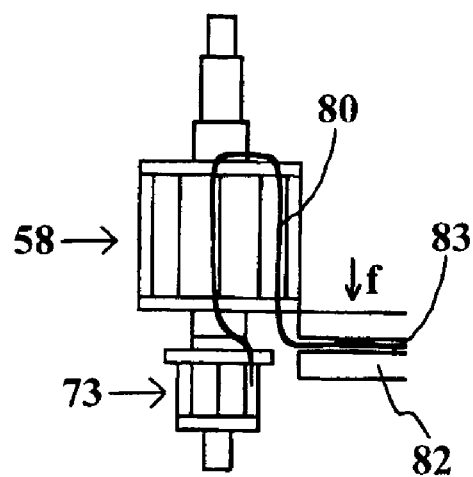
FIG. 12 (8)
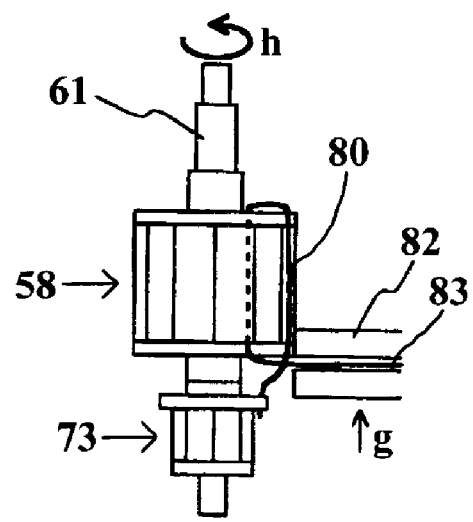
FIG. 12 (9)
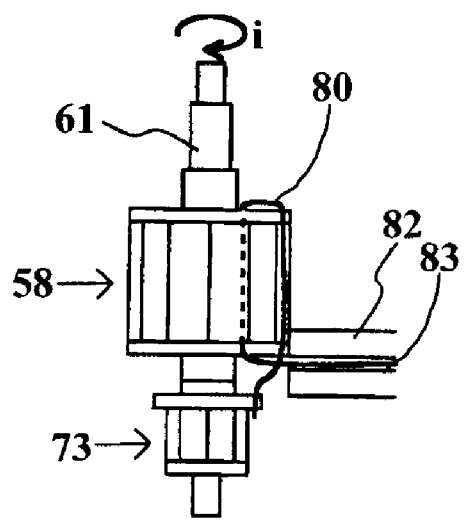

FIG. 12 (10)
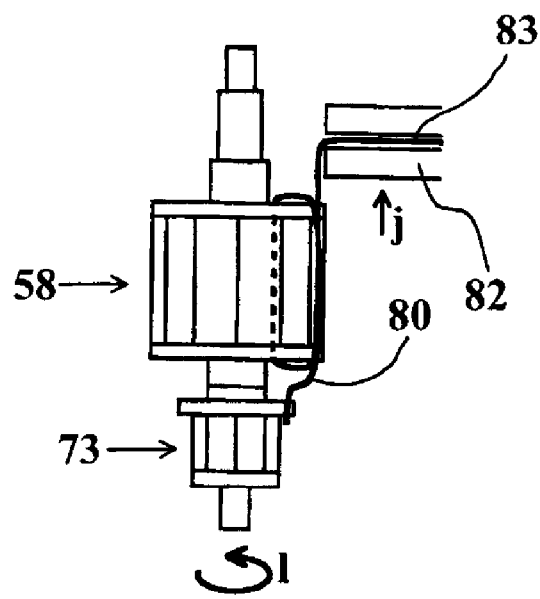
FIG. 12 (11)
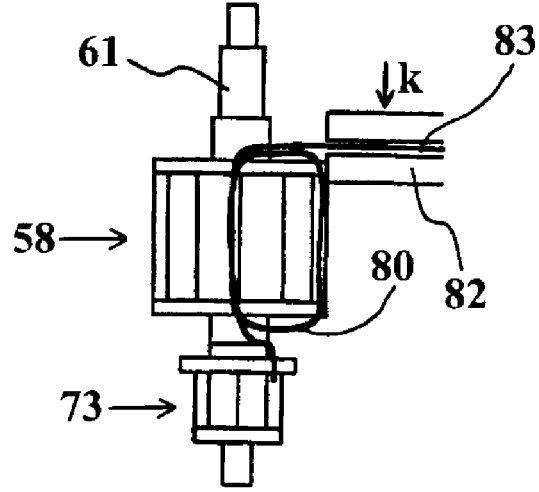
FIG. 12 (12)
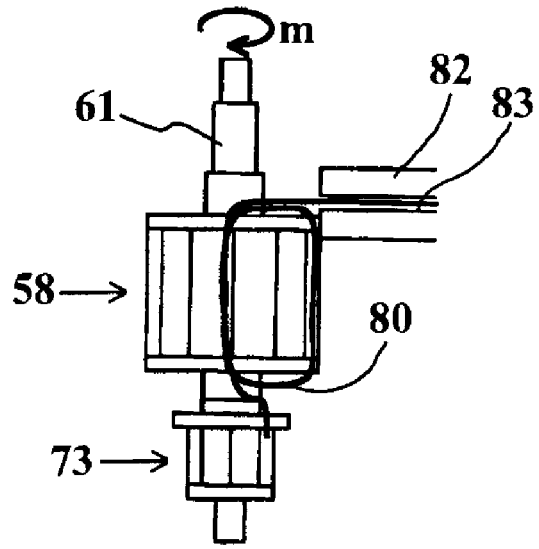

FIG. 12 (13)
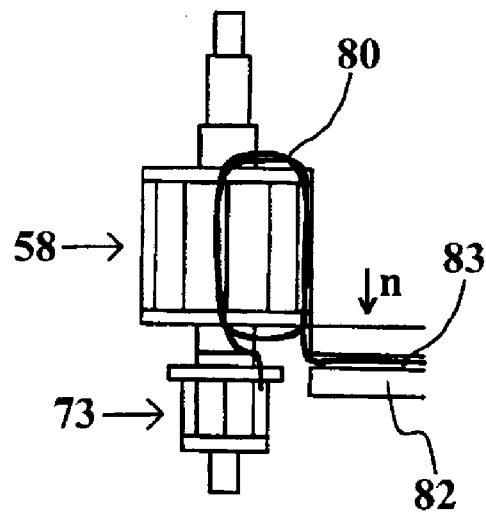
FIG. 12 (14)
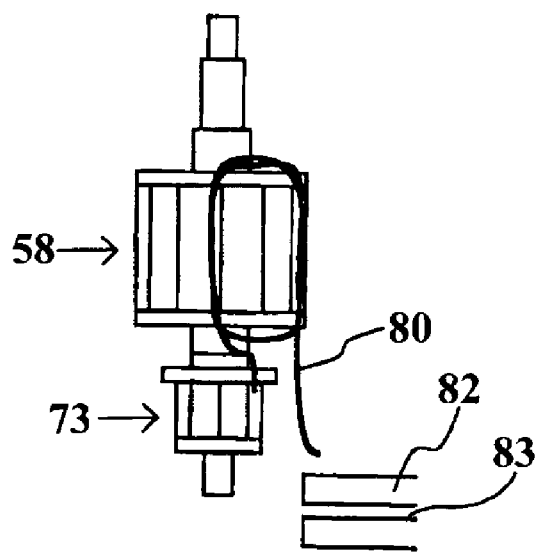
FIG. 12 (15)
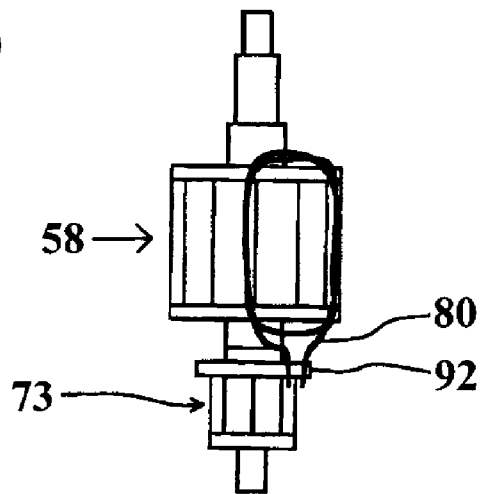

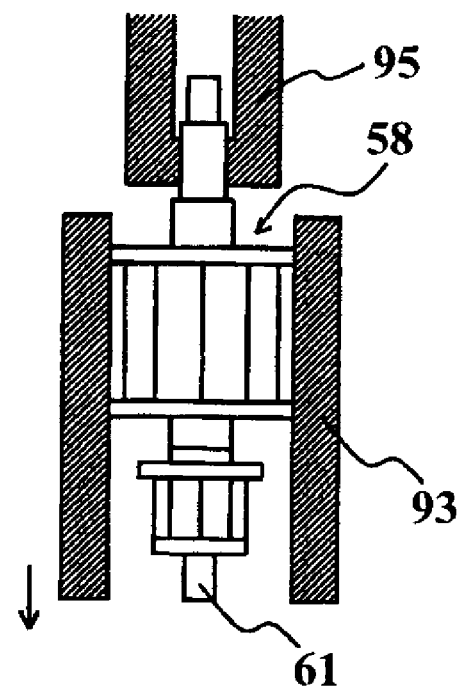
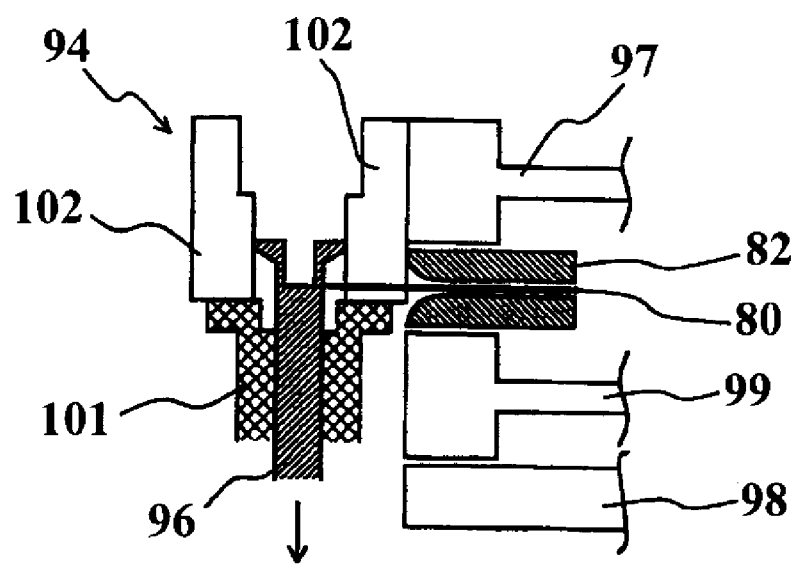
FIG. 13

FIG. 15
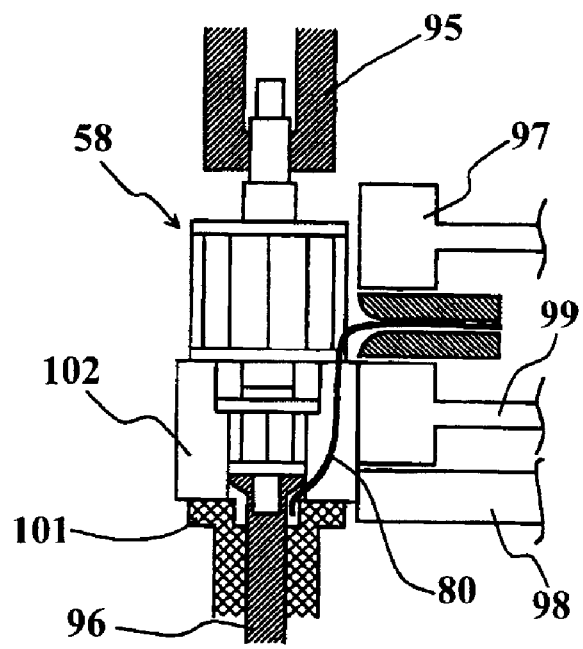
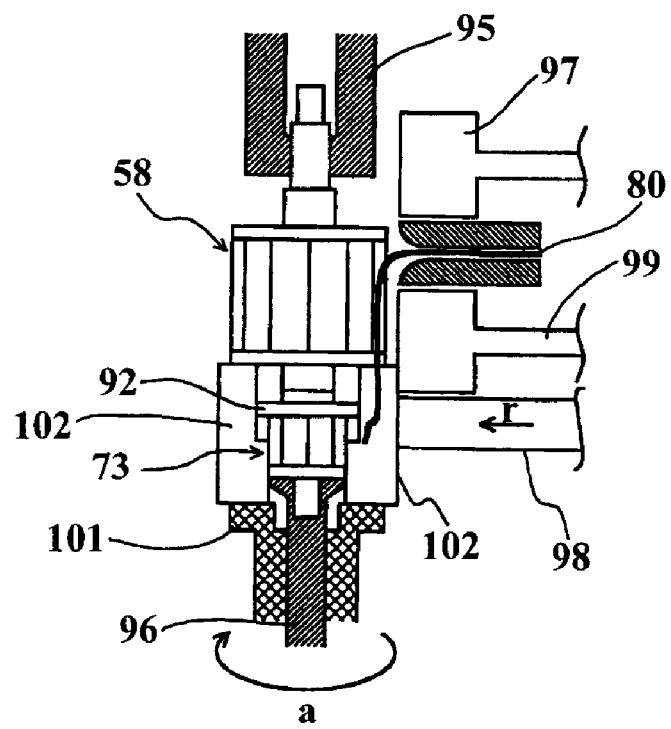
FIG. 16

FIG. 19
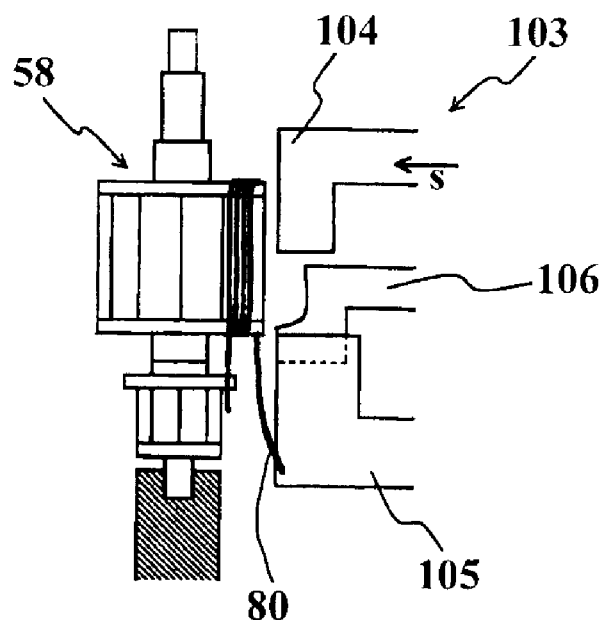
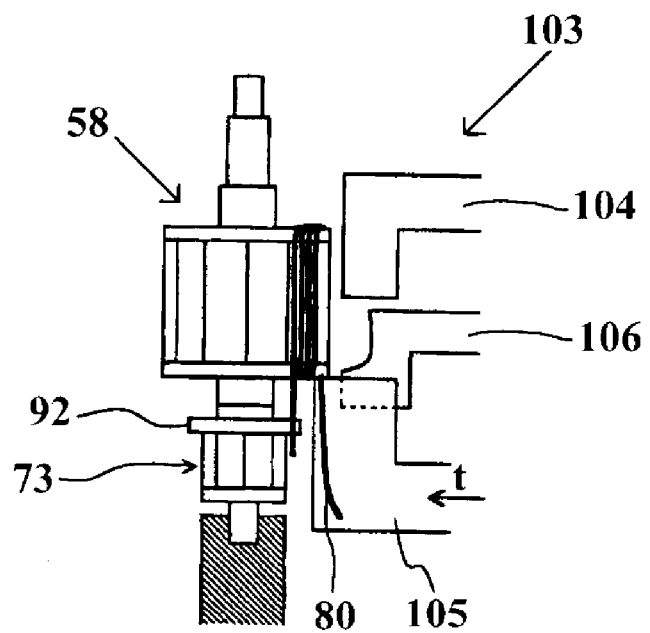
FIG. 20

FIG. 21
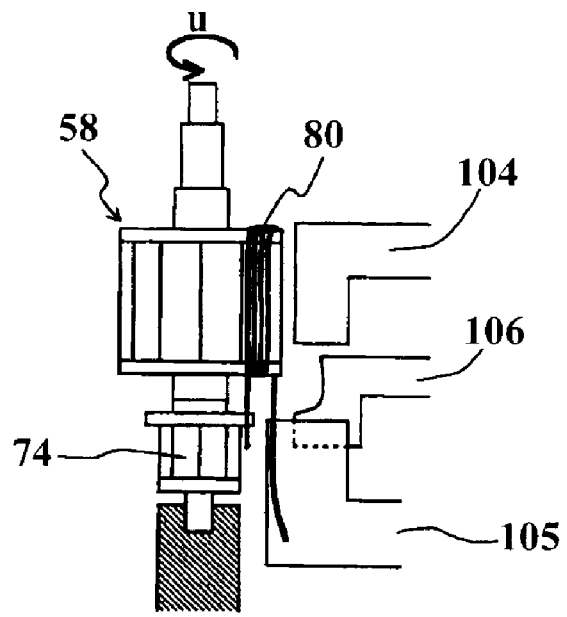
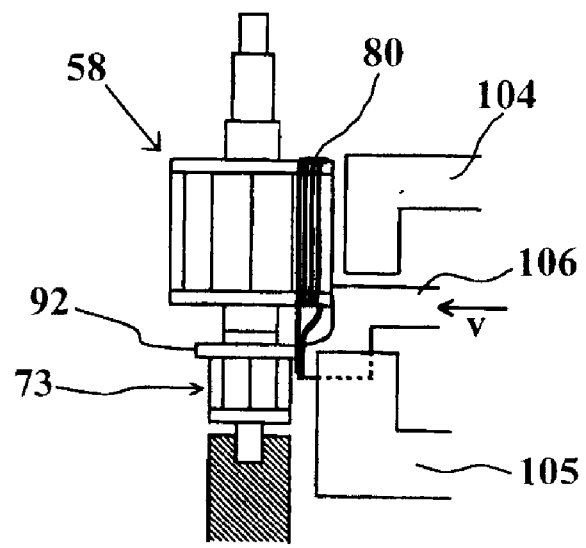
FIG. 22

WINDING METHOD AND DEVICE FOR AN ARMATURE FOR ROTARY ELECTRIC MACHINES

BACKGROUND OF INVENTION

This invention relates to rotary electrical machines and more particularly to an improved winding method and apparatus for the armature coils for such machines.

Rotating electrical machines have been proposed for many applications. For example they may be used as a starter motor for an internal combustion engine. In such an application, a DC electric motor is powered from a battery for starting the engine. The starter motor generally comprises a stator comprising a cylindrical yoke with a plurality of magnets circumferentially bonded to an inner surface of the yoke. An armature (rotor) having coils arranged opposite the magnets and supplied with electrical current for driving a rotating shaft of the armature forming a output shaft of the starter motor. The motor output shaft drives a crankshaft of the engine via a reduction gear, an overrunning clutch for starting the engine in a well known manner.

The magnets may be ordinary magnets obtained by magnetizing a ferrite type magnetic material. The coils are formed by winding a wire (in general, a thin wire having a diameter of 0.9 mm or less) on each of a plurality of radially arrayed magnetic pole teeth of the armature. These pole teeth have a general T-shape. At this time, the core pole teeth are covered with insulators around which the wire is wound.

However, if this thick wire is used in a conventional winding device, tension in winding becomes larger because of the wire thickness. As a result the wound wire does not slide smoothly along the guide plate and fails to enter the slots easily. Also the curvature of the wire during winding becomes larger to prevent smooth winding.

However, if the nozzle is simply moved on the outside of the slots along rectangular magnetic teeth in a looping fashion, the thick wire with a large curvature interferes with edges of the magnetic pole teeth. This prevents smooth winding because the wire is stretched around the coil end portions with a large pressing force and reaction from the curvature of the thick wire results in a high tension. Thus, the wound wire is not allowed to freely move into the entrances from the coil end portions, preventing formation of stable and uniform coils.

SUMMARY OF INVENTION

A first feature of this invention is adapted to be embodied in a winding method for an armature for rotary electric machines having a core with a plurality of radially extending magnetic pole teeth and wherein the pole teeth are circumferentially spaced to form with slots between adjacent magnetic pole teeth. The method comprising the steps of introducing a wire into a slot moving a strand of wire in a looping fashion around at least one magnetic pole teeth to form a coil continuously along the magnetic pole tooth nozzle on the outside circumferential side of the core. The looping comprising in succession an axial forward motion from one side face of the armature to the other side face of the armature when in registry with a first slot at one circumferential side of the pole tooth, a circumferential forward motion on the other side face of the of the armature to registry with a second slot, an axial return motion from the other side face of the armature to the one side face of the armature and a circumferential return motion to the first slot. In accordance with the invention, at least one of the circumferential motions extends past the registry with the respective slot and then back to registry therewith for introducing slack in the wire being wound.

Another feature of the invention is adapted to be embodied in a winding device for simultaneously winding a plurality of coils on the radially extending poles of an armature. The winding device comprises an annular needle ring having a shape complimentary to the armature. A plurality of needle openings pass radially through the needle ring for delivering a plurality of wires for winding around the pole teeth. A drive effects relative rotation and axial movement between the needle ring and an armature for looping the plurality of wires around the pole teeth.

BRIEF DESCRIPTION OF DRAWINGS

FIG. 4 is a developed view the winding pattern for one of the coils.

FIG. 5 is an end elevational view showing the armature as shown in FIG. 2 with the winding apparatus disposed around it.

FIG. 8 is a partial enlarged top plan view showing the winding apparatus.

FIG. 9 is a cross sectional view taken through the portion of the mechanism shown in FIG. 8.

FIG. 10 is a view, in part similar to FIG. 4, but shows the winding pattern.

FIG. 11 is a perspective view again showing the winding pattern.

FIGS. 12 (1), 12 (2) and 12 (3) show the positions of the winding apparatus at the steps shown as (1), (2) and (3) during the movement from the point A to the point B as shown in FIG. 11.

FIGS. 12 (4), 12 (5) and 12 (6) show the positions of the winding apparatus during the movement from the point B to the point C and then to the point D indicated at the steps (4), (5) and (6) in FIG. 11.

FIGS. 12 (7), 12 (8) and 12 (9) show the positions of the apparatus during the movement from the point D to the point E and then the point F shown by the steps (7), (8) and (9) in FIG. 11.

FIGS. 12 (10), 12 (11) and 12 (12) show the positions of the apparatus when moving from the point A to the point D at the steps (10), (11) and (12) in FIG. 11.

FIGS. 12 (13), 12 (14) and 12 (15) show the positions of the apparatus during the movement from the point D to the point C and then to the point F as shown in the steps (13), (14) and (15) in FIG. 11.

FIGS. 13 through 23 are side elevations views with portions shown in cross section of the winding apparatus during the various steps of winding.

DETAILED DESCRIPTION

Figure 1:
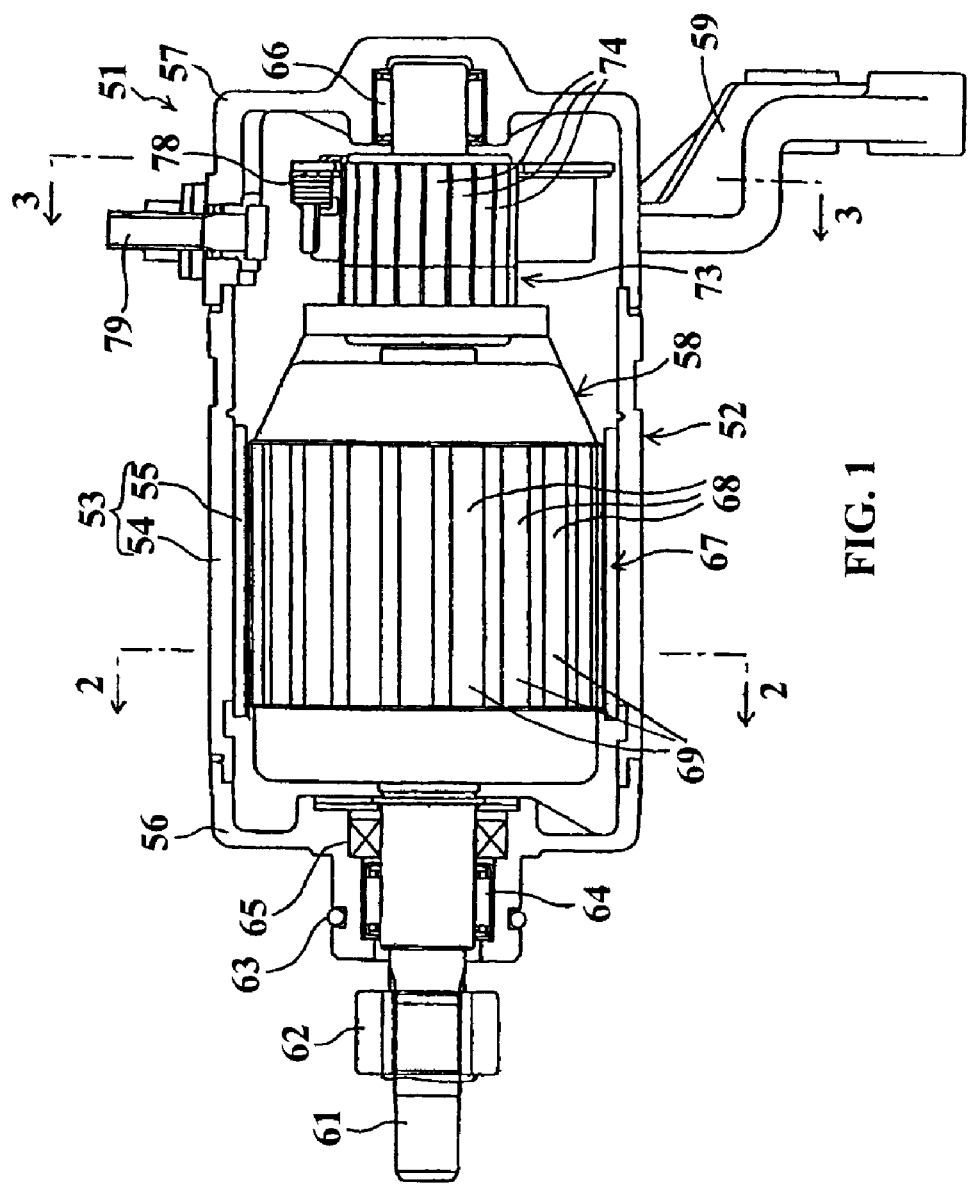
FIG. 1 is a cross sectional view taken generally along the axis of rotation of an electrical starter motor constructed in accordance with the invention.
Figure 2:
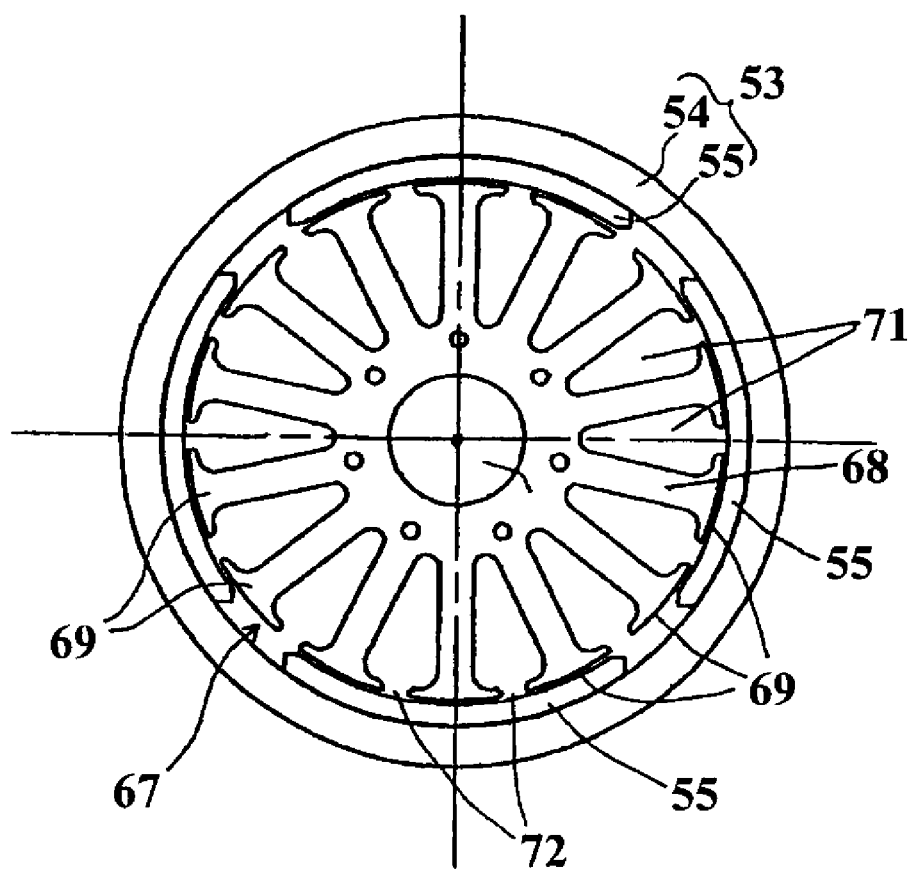
FIG. 2 is a cross sectional view taken along the line 2—2 of FIG. 1.
Figure 3:
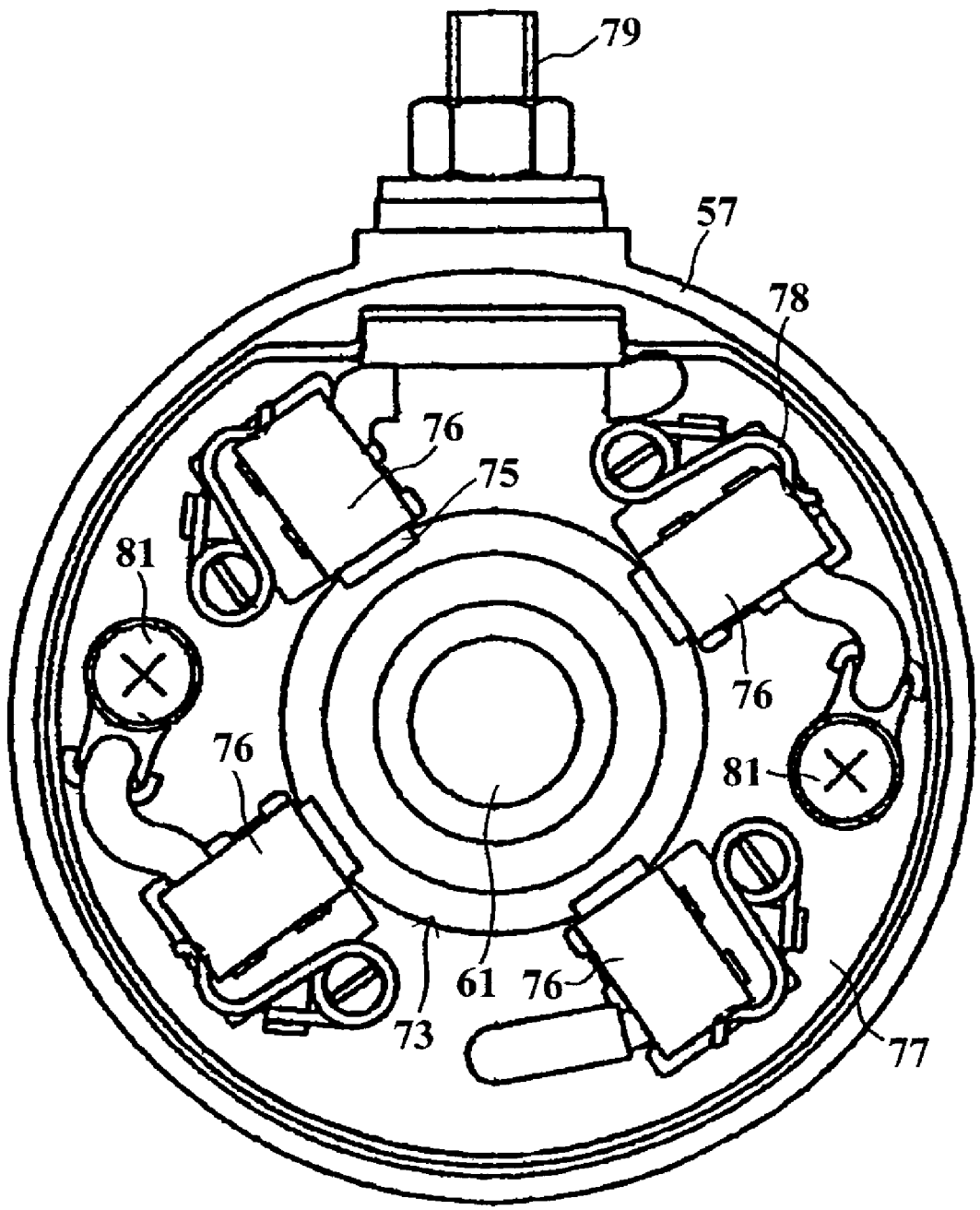
FIG. 3 is a cross sectional view taken along the line 3—3 of FIG. 1 and shows the brush carrier arrangement of the motor.

Referring now in detail to the drawings and initially to FIGS. 1 through 3, a starter motor for an internal combustion engine is indicated generally by the reference numeral 51. The starter motor 51 is shown as an embodiment of the invention and although this specific application is illustrated, it should be readily apparent to those skilled in the art that the invention can be utilized with other types of rotating electrical machines.

The starter motor 51 is comprised of an outer housing assembly, indicated generally by the reference numeral 52, which includes a cylindrical yoke portion, indicated generally by the reference numeral 53. The yoke portion 53 is comprised of a cylindrical shell 54 on the inner surface of which are bonded a plurality of circumferentially spaced permanent magnets 55. In the illustrated embodiment, there are four such permanent magnets 55 and they are arranged with alternating plurality in a circumferential direction. Preferably, these permanent magnets 55 are formed from a neodymium type material that provides a high energy permanent magnet.

The housing 52 is completed by means of a front end cap 56 and rear end cap 57 that are affixed in any suitable manner to the ends of the yoke shell 54 to define an enclosed space in which a rotor in the form of an armature, indicated generally by the reference numeral 58 is journal led. The rear end cap 57 is formed with a mounting bracket 59 so as to permit attachment to the body of the associated engine.

The rotor or armature 58 is comprised of an armature shaft 61, the forward end of which carries a starter gear 62 for associated with the starter gear on the flywheel of the associated internal combustion engine. The end cap 57 has a projecting end in which an O-ring seal 63 is received so as to provide a good seal around the starter gear. This end of the armature shaft 61 is journaled in the end cap 57 by an anti-friction bearing 64. An oil seal 65 is disposed immediately to the rear of the bearing 64. In a like manner, the rear end of the armature shaft 61 is journaled in an anti-friction bearing 66 carried by the end cap 57.

The armature 58 is comprised of a core, indicated generally by the reference numeral 67, and which has a construction as best shown in FIG. 2. This is comprised of a laminated core having a plurality of radially extending pole teeth 68 which have enlarged head portions 69. These pole teeth 68 are circumferentially spaced from each other to define slots 71 therebetween. The enlarged head portions 69 leave a narrow mouth 72 therebetween opening into the slots 71.

Although not shown in details in FIGS. 1 through 3, individual coil windings are formed around the pole teeth 68 in the manner to be described shortly. The ends of these windings are connected, in a manner also to be described shortly, to a commutator, indicated generally by the reference numeral 73 and specifically to the contact strips 74 thereof.

As best seen in FIG. 3, brushes 75 are carried by brush carriers 76 mounted on a commutator plate or brush holder 77. These brushes 75 are urged into engagement with the commutator strips 74 by springs 78.

The electrical current for energizing the windings is delivered through a terminal box 79 carried on the rear end cap 57. The electrical current is supplied to the brushes 75 from terminals 81. This electrical arrangement is of a type well known in the art and, for that reason; a detailed description of it is not believed to be necessary. Again, since the generally construction of the starter motor 51 is of the type well known in the art, its details of construction except for the except for the way in which the coil windings are formed may be of any type known in the art.

The method and apparatus by which the coil windings are formed will now be described. First, the method of winding a single coil will be described by reference to FIG. 4. In forming the coils, a wire 80 is wound around each set of a given number (four in the illustrated example) of magnetic pole teeth 68 twice to form a coil having two turns. One coil for each set of the four magnetic pole teeth is formed successively by changing the starting point of winding in a tooth by tooth pattern.

To do this, a starting end of a wire 80 of each coil is secured to a commutator strip 74 of one of middle two magnetic pole teeth 68 among the four magnetic pole teeth, and the terminating end thereof to the next commutator strip 74, as shown in FIG. 4. This terminal commutator strip 74 constitutes a starting end of the next coil. Thus, the wire 80 is secured to a commutator strip 74 corresponding to a magnetic pole tooth 68 located centrally of the given number of magnetic pole teeth 68 around which is wound the wire 80, therefore the coil is configured such that a wire 80 is led obliquely from the starting and terminating two commutator strips 74 for winding. This winding action of the wire 80 is repeated (or winding actions are performed simultaneously), and coils are formed successively with respect to all the commutator strips 74, one for each set of four magnetic pole teeth 68.

In this winding action, when a thick wire (1 mm. diameter or greater) is used, a nozzle supplying the wire makes two looping motions outside slots as shown in the figure to introduce a coil into the slots so as to form a coil around the magnetic pole teeth. In this invention, the same number of nozzles as the radial magnetic pole teeth 68 are provided, corresponding thereto, at the outside circumferential side of the core, and the same number of coils as the magnetic pole teeth are formed with respect to all the magnetic pole teeth 68 simultaneously from the outside circumferential side of the core 67.

FIG. 5 is a schematic view of a winding device for carrying out the foregoing simultaneous winding according to this invention, with a rotor set thereon. As has been noted, slots 71 are formed between radial magnetic pole teeth 68 armature 67. A nozzle ring 82 is mounted in surrounding relation to the armature 67. The nozzle ring 82 is provided with a number of nozzles 83 corresponding in number to the slots 71 (fourteen in this figure), that is, as many nozzles 83 as there are slots 71.

Each nozzle 83 extends radially through the nozzle ring 82. The inside circumferential side end of the nozzle 83 constitutes an outlet of for the wire 80 is chamfered or rounded at the corner for protection of the insulating coating of the wire. The wire supplied from the nozzle 83 and inserted into a slot 71 through the respective slot entrance 72.

Then, one or both of the nozzle ring 82 and the core 67 is rotated and moved axially, causing each nozzle 83 to make a looping motion relative to the magnetic pole teeth 68, so that the wire is wound around the magnetic pole teeth 68 to form a coil. This motion will be described in more detail later by reference to FIGS. 10 and 11.

Figure 6:
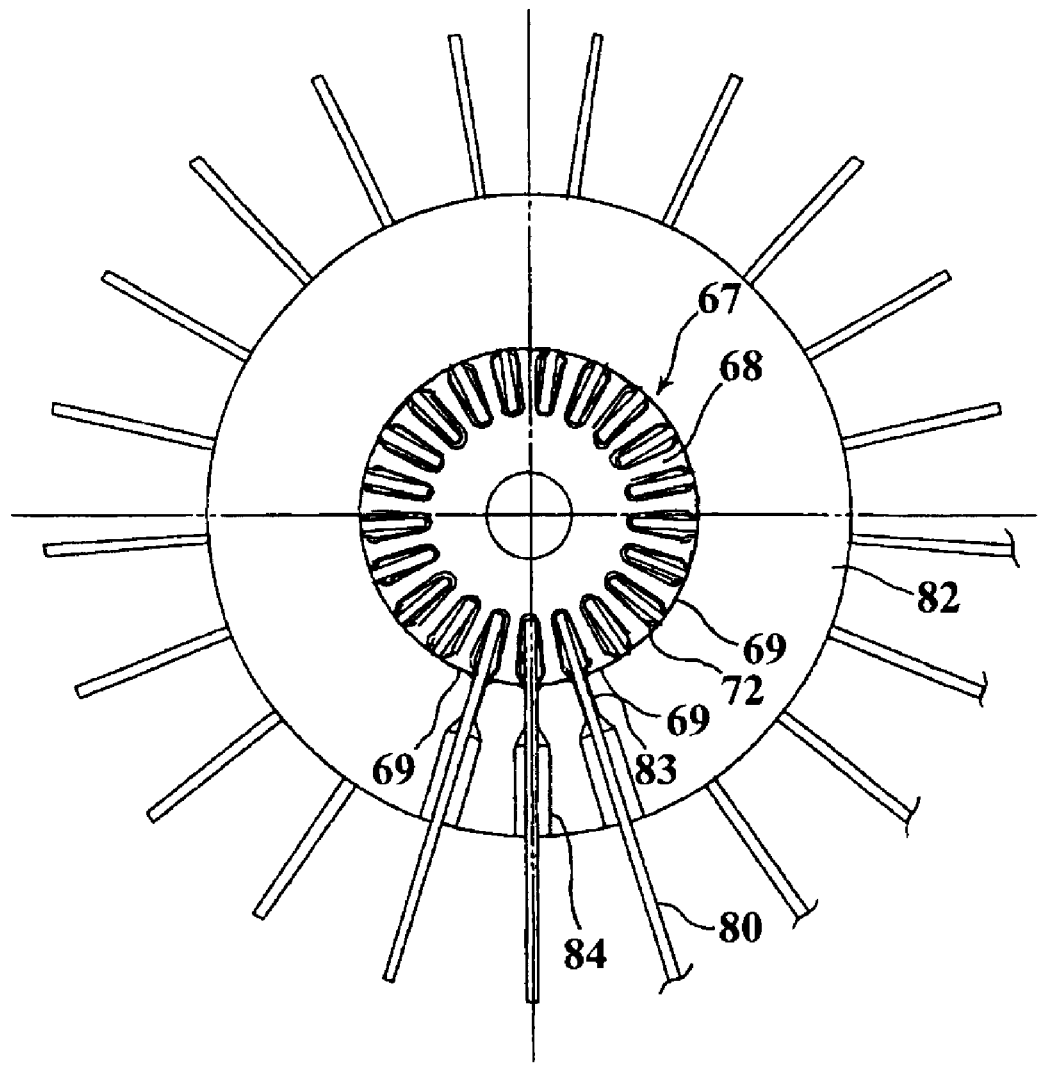
FIG. 6 is a view looking in the same direction as FIG. 5 but shows in more detail the winding apparatus.
Figure 7:
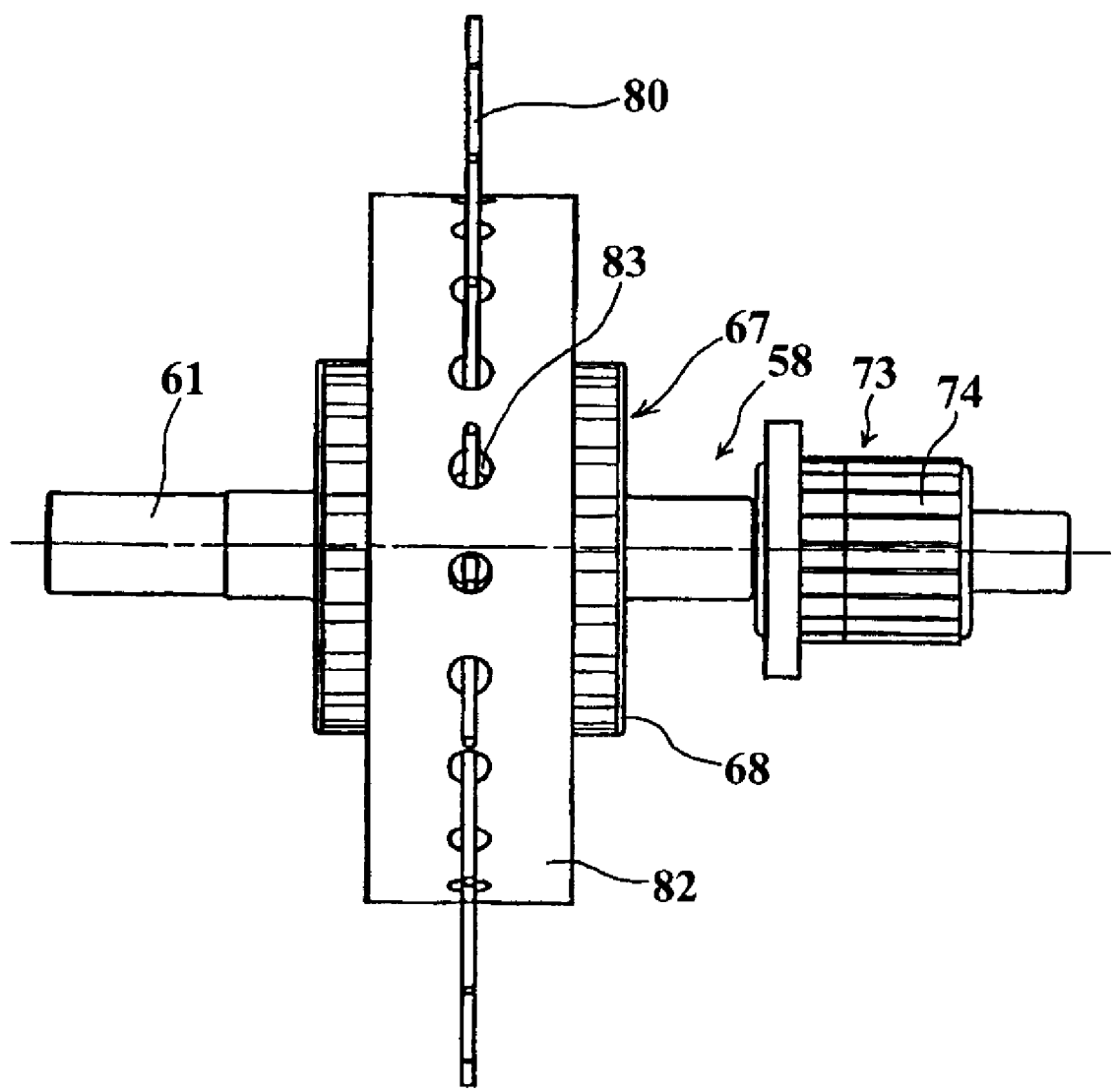
FIG. 7 is a side elevational view of the apparatus as shown in FIG. 6.

As shown in FIGS. 6 and 7, in this example the nozzle ring 82 is provided with twenty-one nozzles 83 each corresponding to the respective twenty-one slots 71 of the armature 67. The nozzle hole 83 passing radially through the nozzle ring 82, has a large diameter portion at the outer circumferential side, which constitutes a guide hole 84 (FIG. 6). The guide hole 84 serves as a guide for a wire to be inserted, and has a large diameter for easy insertion. A wire 80 of a given length corresponding to the length of one coil is passed through the guide hole 84 and inserted into the corresponding slot 71.

Referring now to FIGS. 8 and 9, the nozzle ring 82 is mounted on a rotatable turntable 85. A pipe 86 is provided on the turntable 85 at the outside of each nozzle hole 83. Each pipe 86 is formed, at its radially outer end, with a cutout 87 on the upper side. A stopper 88 pivotally mounted on a shaft 89 at each of the cutouts 87. The stopper 88 serves as a means of preventing the wire inserted in the pipe 86 from slipping out.

The armature 58 is positioned centrally of the nozzle ring 82. The wire passes through the pipe 86 to be supplied from the nozzle 83 in the nozzle ring 82 into a slot 71 of the armature 58. Over and under the turntable 85 are provided blade-driving cylinders 91 for use in wire winding to be described later.

The winding pattern and method will now be described by reference to FIGS. 10 and 11. As shown in these figures, when wire winding action is performed on four magnetic pole teeth 68, a nozzle opening 83 makes a looping motion through the path indicated at A→B→C→D→E→F→A. That is, the nozzle moves along one slot entrance 72 from position A to position B beyond one core tooth 68, and then circumferentially to position C beyond the slot entrance 72 at the end of the core tooth group being wound. Then is returned at D to this end slot entrance 72.

Then, the nozzle 83 returns along the coil slot entrance 72 to position E beyond the other coil slot entrance 72. Then the nozzle 83 moves circumferentially to the position F beyond the initial slot entrance 72. It then returns along the coil end to the position A. This motion is repeated and a wire is wound around the magnetic pole teeth 68 to form a further coil.

The actual positioning of the nozzle ring 82 and the armature 58 during this operation is shown in more detail in FIG. 12 (1) through FIG. 12 (15), these figure numbers correspond to the marked points in FIG. 11. In these figures, only a single nozzle opening 83 is illustrated, but it should be readily apparent that each of the nozzle openings 83 is functioning in the same manner simultaneously during this winding operation.

These motions are described by reference to the various sub-figures of FIG. 12 as follows:

FIG. 12(1) The end of the wire 80 is clamped with a clamping mechanism (not shown) and pulled out from a nozzle opening 83.

FIG. 12(2) The nozzle ring 82 with the wire 80 clamped is raised as shown by arrow a.

FIG. 12(3) Raising of the nozzle ring 82 is paused for a moment and the rotor shaft 61 is rotated in the direction of arrow b with the end of the wire 80 being held, to offset the end of the wire 80 circumferentially. With the end of the wire offset, the end of the wire 80 is pushed into a groove (not shown) of a wire holding section 92 of the commutator 73 by the blade driving cylinder 91. Thus, the slot entrance corresponding to the contact strip 74 of the starting end of the coil is offset circumferentially, as illustrated in FIG. 4.

FIG. 12(4) The nozzle ring 82 is then raised to point B of FIG. 11 beyond a coil end portion.

FIG. 12(5) While the nozzle ring 82 is lowered in the direction of arrow c the rotor shaft 61 is rotated in the direction of arrow d, to move the nozzle ring 82 to point C of FIG. 11 where there is a circumferential overrun.

FIG. 12(6) The rotor shaft 61 is rotated in the direction opposite to that in the step shown in FIG. 12(5) (direction of the arrow e), and thus move the nozzle from point C of FIG. 11 to point D corresponding to the next entrance to a slot 71.

FIG. 12(7) The nozzle ring 82 is lowered in the direction indicated by the arrow f to move it to point E of FIG. 11 where it is overrun below the coil end portion.

FIG. 12(8) The nozzle ring 82 is raised in the direction shown by the arrow g so as to return it by the downward overrun, the rotor shaft 61 is rotated in the direction of arrow h to move the nozzle opening 83 to point F of FIG. 11 where it is overrun circumferentially from the initial slot position.

FIG. 12(9) The rotor shaft 61 is rotated in the direction of arrow i, to return the nozzle opening 83 from point F to point A of FIG. 11. Thus, coil winding action for the first turn is completed.

FIG. 12(10) The nozzle ring 82 is raised in the direction of arrow j to start the winding action for the second turn. This moves the nozzle opening 83 to point B where it is overrun upwardly, as in the step shown in FIG. 12(4).

FIG. 12(11) While lowering the nozzle ring 82 in the direction of arrow k so as to return it by the overrun, the rotor shaft 61 is rotated in the direction of arrow l, to move the nozzle opening 83 to point C where it is overrun circumferentially, as in the step shown in FIG. 12(5).

FIG. 12(12) The rotor shaft 61 is rotated in the direction of arrow m so as to return the nozzle by the overrun, move the nozzle to point D, as in the step shown in FIG. 12 (6).

FIG. 12(13) The nozzle ring 82 is lowered in the direction of the arrow n, and moved to point E where it is overrun downwardly, as in the step shown in FIG. 12(7).

FIG. 12(14) The nozzle ring 82 is lowered further so that the terminating end of the wire 80 of a given length (length for two turns in this example) comes out from the nozzle opening 83.

FIG. 12(15) The terminating end of the wire is pushed by one of the blade driving cylinder 91 into a groove (not shown) of the wire holding section 92 of the commutator 73 to be held. The groove for the terminating end of the wire 80 is a groove adjacent to that for the starting end of the wire.

Then, the end portions of the wire protruded downwardly from the wire holding section 92 are trimmed and the starting and terminating ends of the wire are more positively affixed to the wire holding section 92 by hot caulking.

Thus, one coil of two turns is formed over, for example, four magnetic pole teeth (FIG. 10). Such coiling action is performed with respect to all the magnetic pole teeth using the foregoing nozzle ring 82 (FIG. 5 and FIG. 6) simultaneously, and all coils are formed simultaneously in one coil forming process.

FIGS. 13–23 are more detailed schematic views showing the apparatus and method, in step by step order during the procedure of winding according to this invention.

As shown in FIG. 13, an armature 58 held by a holder 93 such as a carrier robot hand is carried above a winding device 94, and the upper part of the rotor shaft 61 is gripped with a chuck 95 on the winding device. The winding device 94 has a clamp 96 for holding the armature 58, an upper movable blade 97, the nozzle ring 32 below the upper movable blade 97, a fixed blade 98 and a lower movable blade 99 below the nozzle ring 82.

The clamp 96 is movable vertically with respect to a pedestal 101 for mounting the armature 58. On the pedestal 101 are provided pairs of guide blades 102 corresponding radially to the slot entrances 72 of the armature 58, one pair for each entrance.

The upper movable blade 97 enters a gap between blades of the guide blade 102, and pushes a wire 80 into the slot 71.

To this end, the wire 80 is passed through the nozzle opening 83, and the tip end of the wire is brought into contact with or close to the clamp 96. At this time, the wire 80 passes through a pair of blades of the guide blade 102 as seen in FIG. 13.

Figure 14:
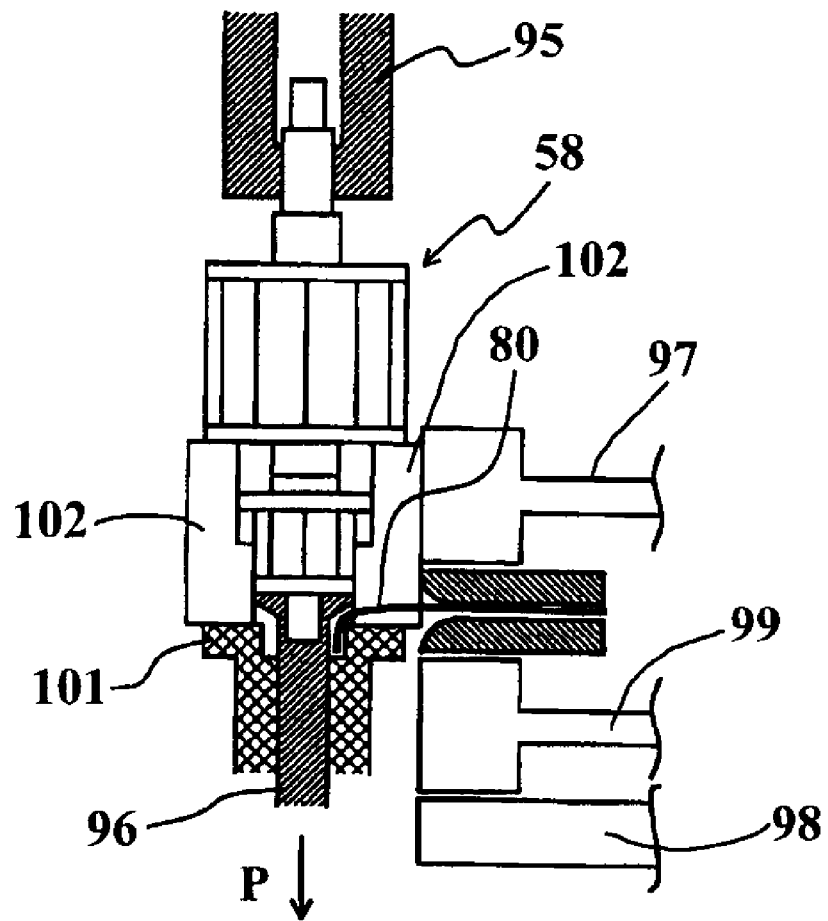

Then, as shown in FIG. 14, the armature 58 released from the holder 93 (FIG. 13), gripped by the chuck 95, is lowered and placed on the pedestal 101. Then, the clamp 96 is lowered in the direction of arrow p to clamp the end of the wire 80.

Then, as shown in FIG. 15, the armature 58 is lowered (or the movable blades 99, 97, fixed blade 98, and nozzle opening 83 are raised) to start the upward stroke of the wire 80. The wire 80 is raised while placed between the blades of the guide blade 102.

Then, as shown in FIG. 16, clamping of the end of the wire 80 by the clamp 96 is released in the middle of the upward stroke of the wire 80 and the upward stroke is stopped for a moment. Then, the guide blade 102 is rotated in the direction of arrow q with respect to the armature 58 to twist the starting end of the wire 80 (this motion corresponds to the step of FIG. 12(3). With the wire 80 twisted slightly, the lower movable blade 99 is moved in the direction of arrow r, and the starting end of the wire 80 is pushed into a groove (not shown) of the wire holding section 92 of the commutator 73 through a gap between the guide blades 102.

Figure 17:
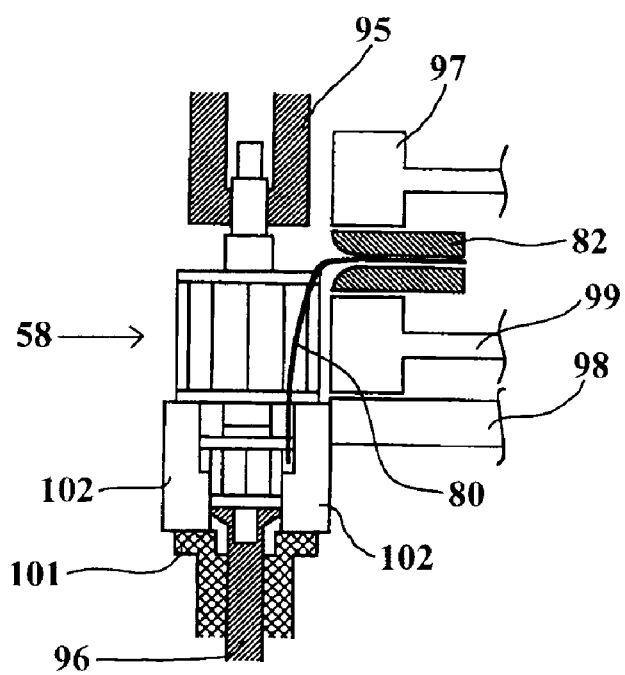

Then, as shown in FIG. 17, the nozzle opening 83 is raised (or the armature 58 lowered) and the wire 80 is stretched.

Figure 18:
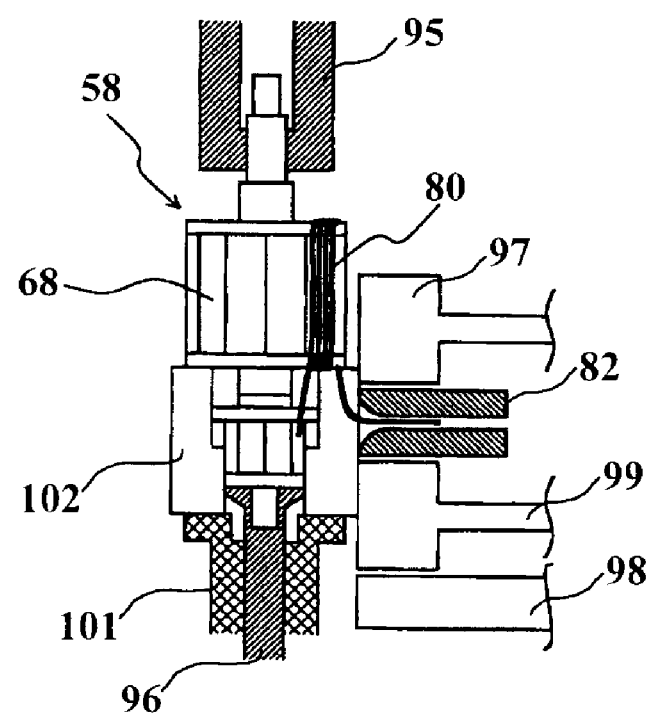

FIG. 18 is a view showing an armature 58 on which a wire 80 is wound around magnetic pole teeth 68 by a given number of repeated winding action of looping motions overrunning axially and circumferentially as shown in FIG. 10 and FIG. 11.

After completion of the winding action, the armature 58 is removed from the device and held again with a holder 93 (FIG. 13) to be transferred as shown in FIG. 19 to another winding device 103. There a positioning blade 104 moves in the direction of arrow s and enters a slot entrance 72 (not shown) of the core, for positioning in the rotational direction.

Then, as shown in FIG. 20, a movable blade 105 consisting of a pair of blades, advances in the direction of arrow t to a position near the wire holding section 92 of the commutator 73 with the terminating end of the wire 80 held between its blades.

Then, as shown in FIG. 21, the armature 58 is rotated in the direction of arrow u, and the terminating end of the wire 80 is twisted circumferentially. The object of this process is to offset the terminating end of the wire for connection to the contact strip 74, as shown in FIG. 4. As a result, the terminating end of the wire 80 faces a groove (not shown) of the wire holding section adjacent to that for the starting end of the wire.

Then, as shown in FIG. 22, a pushing blade 106 advances in the direction of arrow v through a gap between the movable blades 105, and pushes the terminating end of the wire 80 into the groove (not shown) of the wire holding section 92 of the commutator 73.

Figure 23:
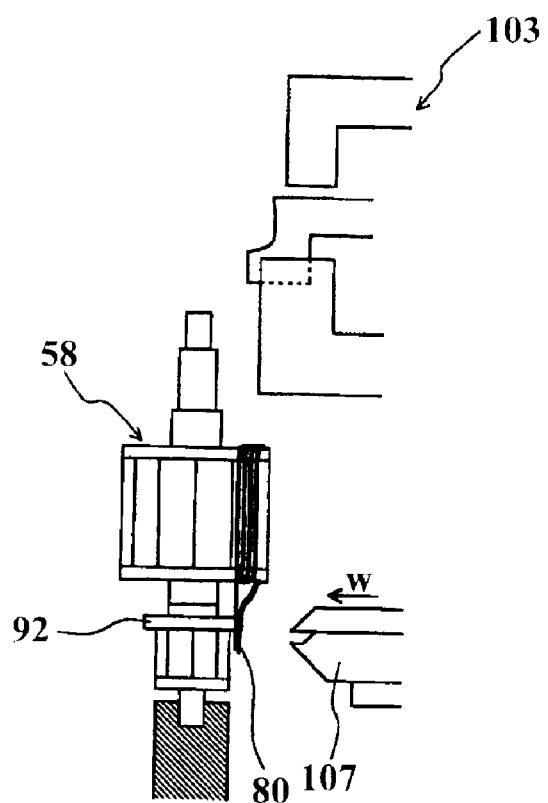

Then, as shown in FIG. 23, the armature 58 is lowered to a position near a cutter 107 disposed downwardly of the winding device 103. The cutter 107 is advanced in the direction of arrow w, and the wire ends protruding downwardly from the wire holding section 92 is trimmed.

According to this invention as described above, in one looping motion of the nozzle, the nozzle overruns a coil end portion, for example, at an axial upward stroke end; it moves, for example, circumferentially while returning by the overrun; it overruns a given position or a slot entrance, at the circumferential stroke end; and it transfers to an axial downward stroke after having returned by the circumferential overrun. Thus, the nozzle is overrun at the axial and circumferential stroke ends and makes subsequent stroke motions while returning or after having returned by the overrun, so that allowance in wire length is produced and smooth winding action is effected when coil winding on the magnetic pole teeth is performed without inserting a nozzle in a slot and by inserting only a wire in the slot. In particular, since circumferential overrun of the nozzle is returned, a tension exerted on the wire at core edges during winding of the coil ends is released, which prevents uneven height of the coil ends or irregular winding due to variation in tension, effecting formation of stable and uniform coil ends. Of course, the foregoing description is that of preferred embodiments of the invention and various changes and modifications may be made without departing from the spirit and scope of the invention, as defined by the appended claims.

What is claimed is:

1. A winding method for an armature for rotary electric machines having a core with a plurality of radially extending magnetic pole teeth, the pole teeth being circumferentially spaced to form with slots between adjacent magnetic pole teeth, said method comprising the steps of introducing a wire into a slot moving a strand of wire in a looping fashion around at least one magnetic pole teeth to form a coil continuously along the magnetic pole tooth nozzle on the outside circumferential side of the core, the looping comprising in succession an axial forward motion from one side face of the armature to the other side face of the armature when in registry with a first slot at one circumferential side of the pole tooth, a circumferential forward motion on the other side face of the of the armature to registry with a second slot, an axial return motion from the other side face of the armature to the one side face of the armature and a circumferential return motion to the first slat, at least one of the circumferential motions extending past the registry with the respective slot and ten back to registry therewith for introducing slack in the wire being wound and continuing winding of the one pole tooth in this fashion until its winding is completed.

2. A winding method for an armature as set forth in claim 1 wherein one of the axial position of the wire is changed during at least one of the circumferential movements.

3. A winding method for an armature as set forth in claim 2 wherein the axial position of the wire is changed during both of the circumferential movements.

4. A winding method for an armature as set forth in claim 1 wherein both of the circumferential motions extend past the registry with the respective slot and ten back to registry therewith for introducing slack in the wire being wound.

5. A winding method for an armature as set forth in claim 4 wherein the axial position of the wire is changed during at least one of the circumferential movements.

6. A winding method for an armature as set forth in claim 5 wherein the axial position of the wire is changed during both of the circumferential movements.

7. A winding method for an armature as set forth in claim 1 wherein a plurality of adjacent pole teeth are encircled by the same loop.

8. A winding method for an armature as set forth in claim 7 wherein the axial position of the wire is changed during at least one of the circumferential movements.

9. A winding method for an armature as set forth in claim 8 wherein the axial position of the wire is changed during both of the circumferential movements.

10. A winding method for an armature as set forth in claim 7 wherein both of the circumferential motions extend past the registry with the respective slot and then back to registry therewith for introducing slack in the wire being wound.

11. A winding method for an armature as set forth in claim 10 wherein the axial position of the wire is changed during at least one of the circumferential movements.

12. A winding method for an armature as set forth in claim 11 wherein the axial position of the wire is changed during hot of the circumferential movements.

13. A winding method for an armature as set forth in claim 1 wherein a plurality of loops are fanned simultaneously around different pole teeth.

14. A winding method for an armature as set forth in claim 13 wherein the axial position of the wire is changed during at least one of the circumferential movements.

15. A winding method for an armature as set forth in claim 14 wherein the axial position of the wire is changed during both of the circumferential movements.

16. A winding method for an armature as set forth in claim 13 wherein both of the circumferential motions extend past the registry with the respective slot and then back to registry therewith for introducing slack in the wire being wound.

17. A winding method for an armature as set forth in claim 16 wherein one of the axial position of the wire is changed during at least one of the circumferential movements.

18. A winding method for an armature as set forth in claim 17 wherein the axial position of the wire is changed during both of the circumferential movements.

19. A winding device for simultaneously winding a plurality of coils on the radially extending poles of an armature comprising an annular needle ring having a shape complimentary to the armature, a plurality of needle openings passing radially through said needle ring for delivering a plurality of wires for winding around the pole teeth, and a drive for effecting relative rotation and axial movement between said needle ring and an armature for looping the plurality of wires around the pole teeth.

20. A winding device as set forth in claim 19 wherein the number of needle openings is equal to the number of gaps between the armature poles.

21. A winding device as set forth in claim 19 wherein the drive effects relative movement between the needle ring and the armature first in a forward axial direction, then in a forward circumferential direction, then in a reverse axial direction then in a reverse circumferential direction.

22. A winding device as set forth in claim 21 wherein the needle openings are positioned in alignment with the armature slots by the drive during the axial movement.

23. A winding device as set forth in claim 21 wherein the needle openings are positioned axially outwardly of the armature cores by the drive during the circumferential movement.

24. A winding device as set forth in claim 23 wherein the needle openings are positioned in alignment with the armature slots by the drive during the axial movement.

25. A winding device as set forth in claim 21 further including an arrangement for holding the end of the wound wire in a fixed position to the armature at the start of the winding so that the wire is drawn through the needle openings during the winding operation.

26. A winding device as set forth in claim 25 wherein the armature has a commutator ring at one side of the pole teeth and the wire end is fixed to a commutator strip of the commutator ring.

27. A winding device as set forth in claim 26 wherein the commutator ring has slots associated with the commutator strips of the commutator ring and the ends of the wire are held in the slots.

28. A winding device as set forth in claim 27 wherein the apparatus includes a pushing device for forcing the held end of the wire in the slot.

29. A winding device as set forth in claim 25 Thither including an arrangement for holding the other end of the wound wire in a fixed position to the armature at the end of the winding operation to complete the coil winding.

30. A winding device as set forth in claim 29 wherein the armature has a commutator ring at one side of the pole teeth and the wire ends are fixed to respective commutator strips of the commutator ring.

31. A winding device as set forth in claim 30 wherein the commutator ring has slots associated with the commutator strips of the commutator ring and the ends of the wire are held in the slots.

32. A winding device as set forth in claim 31 wherein the apparatus includes a pushing device for forcing the held ends of the wire in the respective slots.

33. A winding device as set forth in claim 32 wherein the apparatus further includes a cutter for trimming the held ends of the wire.

34. A winding device as set forth in claim 21 wherein the drive affects sufficient relative motion during movement in at least one of the directions to introduce slack in the wire before the next movement is begun.

35. A winding device as set forth in claim 21 wherein a wire is drawn from each needle opening during the winding operation to wind a number of coils corresponding to the number of needle openings simultaneously.

36. A winding device as set forth in claim 21 wherein the circumferential relative movement effected by the drive is sufficient to encircle a plurality of pole teeth with each winding.

* * * * *